UNITED STATES PATENT OFFICE.

LAURENZ BOCK, OF BAD HOMBURG KIRDORF, GERMANY.

MANUFACTURE OF ULTRAMARINE.

1,239,080.  Specification of Letters Patent. Patented Sept. 4, 1917.

No Drawing.  Application filed January 11, 1917. Serial No. 141,806.

*To all whom it may concern:*

Be it known that I, LAURENZ BOCK, chemical engineer, a citizen of the German Empire, residing at Bad Homburg Kirdorf, in the Province of the Rhine, Germany, have invented certain new and useful Improvements in the Manufacture of Ultramarine, of which the following is a specification.

The object of my invention is to produce ultramarine, quickly, economically and by the utilization of substances heretofore considered of little value.

As it is known, ultramarine is manufactured by heating, burning or calcining a mixture of clay (kaolin, china-clay or the like), sodium carbonate, silica and resin or pitch with sulfur. Up to the present, it was assumed that a good ultramarine could be produced only when using the sulfur in a state as pure as possible. The manufacture of ultramarine was, therefore, dependent upon the possibility of getting pure sulfur at a rather low price, and that said manufacture could not be carried on at places where sulfur in a pure state was only to be obtained at heavy expense.

I have found, however, that, in manufacturing ultramarine, the pure sulfur can be dispensed with and that one can very advantageously make use of an impure, tarry sulfur, such, for instance, as can be obtained by distillation or extraction from waste gas-purifying mass (spent oxid). Heretofore, this spent oxid from gas works was used for producing sulfuric acid, ferrocyanic or ammonium compounds. When used in this way, the sulfur contained in purifying masses was nearly without any value; it is sufficient to recall the fact that in former times the gas-works gave their waste purifying masses, containing a small amount of sulfur or cyanogen, without any payment or compensation to chemical works for the purpose mentioned. Especially the organic impurities present (such as tar) rendered the waste gas-purifying masses useless for other purposes, and, therefore, almost valueless.

According to my invention, the tarry sulfur obtained (by distillation or extraction) from gas-purifying masses, is used in the manufacture of ultramarine in the place of pure sulfur. This is of a high economic importance, and, at the same time, it includes several advantages. This impure sulfur, is, of course, obtainable at an essentially lower price than the sulfur purified (by sublimation). Furthermore, by using this tarry sulfur, it is possible to omit the reducing material which, prior to my invention, had been added mostly in form of tar or coal tar pitch, to the raw ultramarine mixture before burning. No drawbacks whatever have been found when using this tarry sulfur in the manufacture of ultramarine, on the contrary a good product was obtained with reduced cost.

In connection with the measure described above another advantage can be obtained. Formerly much of the heat was spent in burning the ultramarine batch, it having been impossible to make use of this heat in a practicable manner. In my new process, these caloric values are advantageously used for distilling or extracting the sulfur from the waste gas-purifying masses. This may, for instance, be effected by constructing, on the top of the ultramarine muffle-furnaces or crucible-furnaces, retorts or the like which are to contain the material to be treated. As over these ultramarine furnaces there is a high temperature (800 degrees centigrade and more), often lasting for weeks, it is possible to desulfurate great quantities of spent oxid in several operations one after the other, and thereby to cheaply obtain the large amount of sulfur required by an ultramarine-work.

What I claim is:

1. In the manufacture of ultramarine, the improvement which consists in adding to the usual mixture of clay, sodium carbonate and silica, impure sulfur containing tarry substances.

2. In the manufacture of ultramarine, the improvement which consists in adding to the usual mixture of clay, sodium carbonate and silica, impure sulfur containing tarry substances and which is obtained from waste gas purifying masses.

3. In the manufacture of ultramarine, the improvement which consists in adding to the usual mixture of clay, sodium carbonate and silica, impure sulfur containing tarry substances and which is obtained from waste gas purifying masses by utilizing the waste heat of the ultramarine burning furnaces.

In testimony whereof I have affixed my signature in presence of two witnesses.

LAURENZ BOCK.

Witnesses:
  JEAN GRUND,
  HARRY EDWIN CARLSON.

Copies of this patent may be obtained for five cents each, by addressing the "Commissioner of Patents, Washington, D. C."